United States Patent [19]

Wunder et al.

[11] Patent Number: 5,688,100
[45] Date of Patent: Nov. 18, 1997

[54] LOADING DEVICE FOR CONTAINERS OR THE LIKE

[76] Inventors: Johannes Wunder, Seestrasse 52a, A-3224 Mitterbach; Udo Winter, Losensteinerstrasse 23, A-4020 Linz; Johann Schabelreiter, Kirchdorf 20, A-8132 Pernegg; Werner Martin, Simchengasse 2, A-8045 Graz, all of Austria

[21] Appl. No.: 578,576

[22] PCT Filed: Jun. 22, 1994

[86] PCT No.: PCT/AT94/00081

§ 371 Date: Dec. 22, 1995

§ 102(e) Date: Dec. 22, 1995

[87] PCT Pub. No.: WO95/00357

PCT Pub. Date: Jan. 5, 1995

[30] Foreign Application Priority Data

Jun. 23, 1993 [AT] Austria ..................... 1233/93

[51] Int. Cl.⁶ ..................................... B60P 1/64
[52] U.S. Cl. .................. 414/547; 414/549; 414/555
[58] Field of Search ..................... 414/546, 547, 414/549, 552–555; 212/258, 261

[56] References Cited

U.S. PATENT DOCUMENTS

| 2,911,118 | 11/1959 | Tapp .......................... 414/549 |
| 3,468,439 | 9/1969 | Olitsky et al. ............... 212/258 X |
| 3,515,295 | 6/1970 | Klaus ........................ 414/555 |
| 3,557,980 | 1/1971 | Klaus ........................ 414/546 |
| 3,780,877 | 12/1973 | Levitt ....................... 414/555 X |
| 3,876,088 | 4/1975 | Klaus ........................ 212/258 X |
| 4,921,394 | 5/1990 | Watson ....................... 212/258 X |

FOREIGN PATENT DOCUMENTS

| 284714 | 9/1970 | Austria . |
| 2106592 | 5/1972 | France . |
| 2650979 | 2/1991 | France . |
| 2046057 | 3/1972 | Germany . |
| 2201684 | 7/1972 | Germany . |
| 2141774 | 3/1973 | Germany . |
| 302271 | 7/1968 | Sweden ................... 414/546 |
| 1232526 | 5/1986 | U.S.S.R. .................. 414/549 |
| 1512633 | 6/1978 | United Kingdom . |
| 2188029 | 9/1987 | United Kingdom ........ 414/546 |
| 2216499 | 10/1989 | United Kingdom ........ 414/546 |

*Primary Examiner*—David A. Bucci
*Attorney, Agent, or Firm*—Collard & Roe, P.C.

[57] ABSTRACT

A loading device for containers comprises a pair of like loading units to be mounted on a vehicle frame having a longitudinally extending center axis. Each loading unit comprises a bracket, a telescopic column supported on the bracket for pivoting about a common swivel axis defined by the longitudinally extending center axis, the telescopic column consisting of a lower leg portion and an extendable head portion, an operating cylinder acting on the leg portion of the telescopic column at each side thereof, a longitudinally adjustable supporting leg pivotally mounted at each side of the bracket, a cantilever arm carried by the head portion of the telescopic column and adapted to perform a swivel movement to both sides of the telescopic column about a swivel axis extending parallel to the swivel axis of the telescopic column, the cantilever arm comprising an abutment for the connection of a load receiving element, and limit stops on the head portion of the telescopic column for the rigid support of respective swivel positions of the cantilever arm on both sides of the telescopic column.

6 Claims, 2 Drawing Sheets

LOADING DEVICE FOR CONTAINERS OR THE LIKE

BACKGROUND OF THE INVENTION

1. Field of the Invention

This invention relates to a loading device for containers or the like comprising a pair of loading units to be mounted on a vehicle frame, which loading units each have a telescopic column consisting of a lower leg portion and an extendable head portion, which telescopic column is supported on a bracket so as to be pivoted about a common swivel axis extending in the longitudinal center of the vehicle frame, as well as operating cylinders acting on both sides of the telescopic column and longitudinally adjustable supporting legs pivotally mounted on both sides of the bracket, where the head portion of the telescopic columns carries a cantilever arm comprising an abutment for the connection of a load receiving element, for instance a load carrying harness, which cantilever arm is adapted to perform a swivel movement to both sides about a swivel axis parallel to the swivel axis of the telescopic column.

2. Description of the Prior Art

As is for instance shown in the AT-PS 284 714, the operating cylinders of such loading devices have been movably supported on the supporting legs pivoted about horizontal longitudinal axes and have been acting on the head portion of the telescopic columns, which head portion is itself equipped with the load receiving elements and constitutes the load receiving means. With these known loading devices it is possible to load the containers or other bulky items equally onto both sides of the vehicle frame, and to unload or transfer such items from a separate loading surface to the side onto the ground or to another vehicle standing alongside, but due to the mutual positional and motional dependence of telescopic columns, operating cylinders and supporting legs a very expensive, and a complicated loading system is obtained, which requires a relatively large space for its loading and unloading movements, and when there is only little space, or in the danger zone of a railway contact line or the like, is useful only on a very restricted scale. Moreover, the supporting legs, which are movable in the same swivel plane as the telescopic columns, also require a corresponding lateral space for the swivel movement, which for reaching over vehicles standing alongside or other laterally disposed obstacles often requires additional movable stanchions or the like and thus impairs the desired stability of the support.

In accordance with the FR-A-2 106 592 there already exists a loading means comprising loading units each having a cantilever arm pivotally mounted on a telescopic column, where the two-piece cantilever arm can be swivelled with respect to the telescopic column by means of an operating cylinder, and the telescopic column cooperates with two operating cylinders acting on the head portion that carries the cantilever arm. As a result the telescope is extended with the points of attachment of the operating cylinders and thus changes the angle of attack of the cylinders, so that corrections in height influence the lateral directions and make it impossible to perform a defined operation. In addition, the cantilever arm is used as crane jib adjustable under a load, which must perform an active lifting function, so that the control effort and the uncertainty as regards control are further increased.

SUMMARY OF THE INVENTION

It is therefore the object of the invention to eliminate these deficiencies and to create a loading device of the above described kind, which is characterized by its relatively simple and compact design, its stability and the fact that it requires little space as compared to the loading area.

This object is solved by the invention in that the operating cylinders act on the leg portion of the telescopic column, whose head portion constitutes limit stops for the rigid support of swivel positions of the cantilever arm on both sides, and that the supporting legs are supported so as to be pivoted preferably about swivel axes normal to the swivel axis of the telescopic column and inclined towards the horizontal. Due to the cooperation of the operating cylinders with the telescopic columns and the cantilever arms pivotally mounted on the telescopic columns there are large enough lateral loading areas depending on the swivel position of the cantilever arms toward the one side or the other, without having to perform both horizontally and vertically expansive swivel movements of the telescopic columns. Since the operating cylinders act on the leg portion of the telescopic column, there is achieved a clear separation between swivel movement and extending movement of the telescopic column and thus an exact mode of operation, where a swivel movement and at the same time an extension or retraction of the telescopic columns lead to a more or less rectilinear transverse or lifting and lowering movement of the load, so that a loading and unloading operation is possible even with little space available. Due to the limit stops for the cantilever arms the same act as rigid cantilever of the telescopic column, which for the entire lifting operation remains in a defined swivel position, so that a simple operating means, for instance two little swivel cylinders, is sufficient for a load-free swivel movement, which leads to a stable and easily controllable structure that can be handled with little effort. The supporting legs, which each can be swivelled out separately, need no longer be set in consideration of the actuation of the telescopic column, but can simply be positioned to effect an expedient support, where the fact that they can preferably be swivelled at an angle often includes the possibility that they can also swivel laterally at an angle under the loading surface or the like of a vehicle standing alongside and achieve the projection required for a good support.

It is also favorable for the brackets of both loading units to be each longitudinally movable on the vehicle frame, where advantageously the brackets have supports for the containers or the like, as with this individual adjustment of the brackets it is not only possible to adapt the loading device to containers of different sizes or the like, but the loading position of the loading device on the vehicle frame can be changed with respect to the load to be received, and instead of a complicated maneuvering of the vehicle for a proper loading and unloading operation, a simple positioning of the loading device on the vehicle frame is possible. Moreover, the containers picked up can be put down on the supports of the brackets, and then these containers can be moved relative to the vehicle frame by means of the movable brackets, which in turn provides for an optimum adjustment between loading and unloading operation and transport position.

To be able to minimize the maximum loading height, it is possible to movably arrange the abutments on the cantilever arm in the direction of the swivel axis of the cantilever arm for connection of a load receiving element, so that when the load has been put down on the vehicle frame the abutments get free of the load as they are retracted, and the cantilevers can be lowered beside the containers for transport purposes, so that the load itself determines the maximum loading height.

BRIEF DESCRIPTION OF THE DRAWING

In the drawing a preferred embodiment of the invention is illustrated purely schematically.

DESCRIPTION OF THE PREFERRED EMBODIMENT

Figure 1:
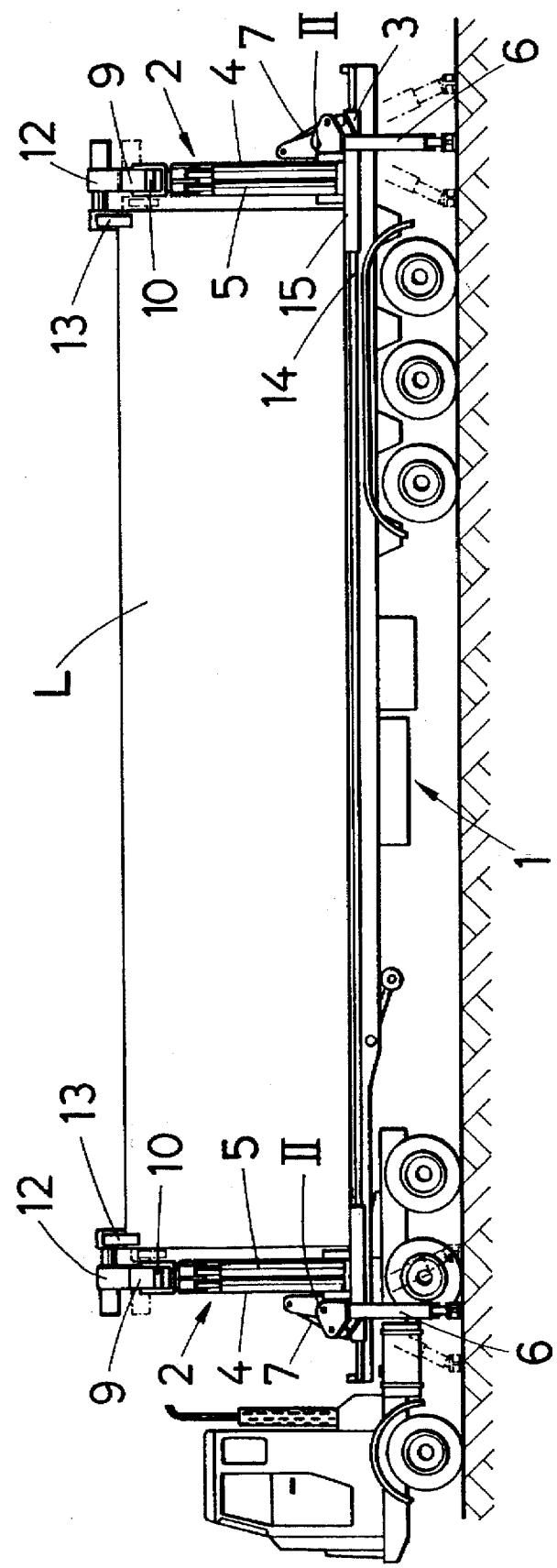
FIGS. 1 and 2 show a vehicle with a loading device in accordance with the invention in a side view and in a rear view.
Figure 2:
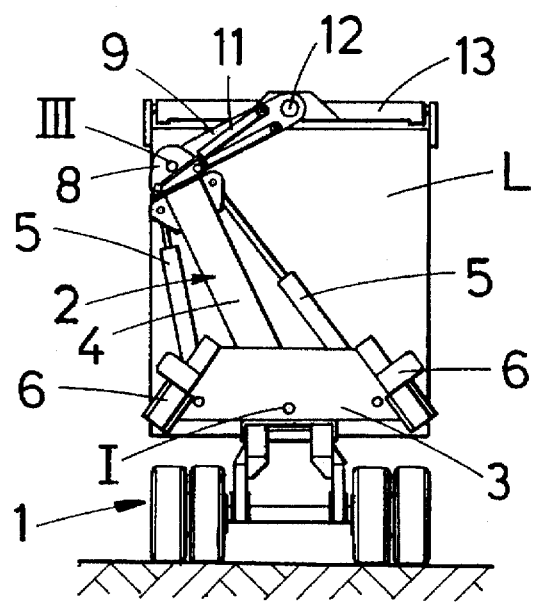
Figure 3:
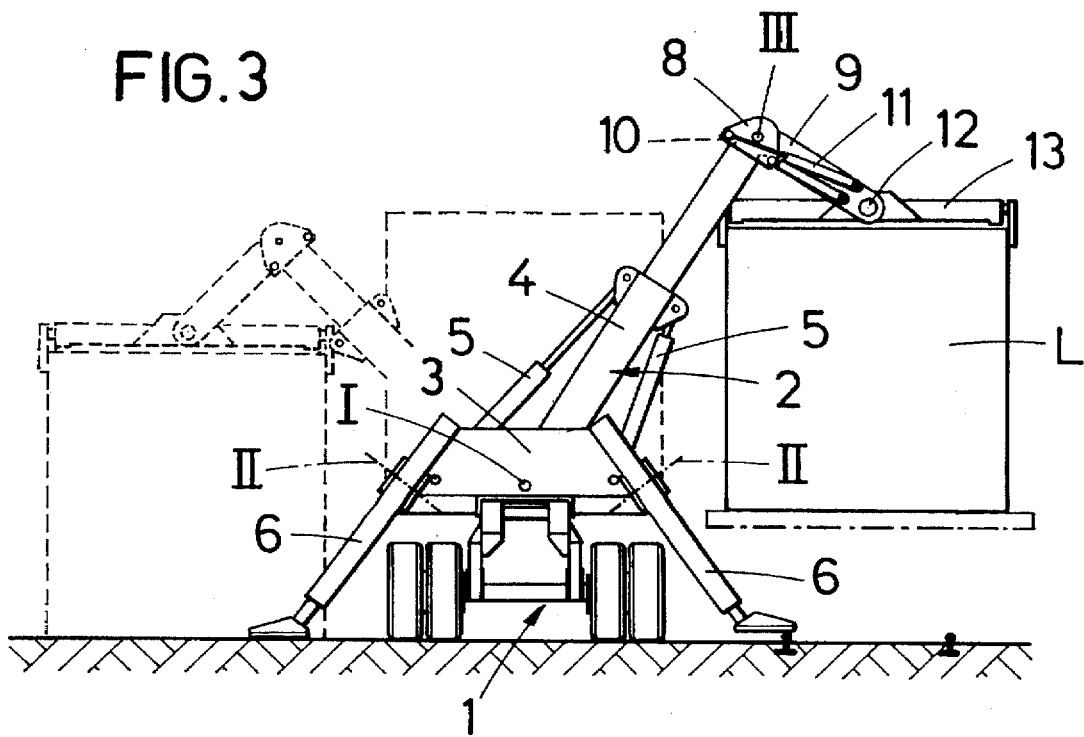
FIG. 3 shows the vehicle during the loading operation in a rear view.

On a vehicle frame 1, for instance a semitrailer of an articulated train, a loading device comprising two loading units 2 is mounted, where each loading unit 2 consists of a bracket 3, a telescopic column 4 pivotally supported on the bracket about the swivel axis I extending in the longitudinal center of the vehicle frame 1, two operating cylinders 5 acting on both sides of the telescopic column 4 and supporting legs 6 movable to both sides. The operating cylinders 5 and the supporting legs 6 are pivotally mounted on the bracket 3 independent of each other. The supporting legs 6 are supported to be pivoted by operating cylinders 7 about swivel axes II normal to the swivel axis I of the telescopic column and inclined towards the horizontal. At the extendable head portion 8 of the telescopic column 4 a cantilever arm 9 is mounted, which is pivotally mounted about a swivel axis III parallel to the swivel axis I of the telescopic column between two limit stops 10, and by means of swivel cylinders 11, the cantilever arm can be moved from the one into the other swivel position. At the free end of the cantilever arm 9 an abutment 12 for the connection of a load carrying harness 13 is provided, which abutment 12 is movable in the direction of the swivel axis III of the cantilever arm from a transport position to a loading position. The brackets 3 are each separately adjustably guided along longitudinal guideways 14 of the vehicle frame 1, where the brackets can be moved together or independent of each other. At the front sides facing each other the brackets 3 constitute supports 15 for supporting the containers L received.

For loading a container L the supporting legs 6 are swivelled to the side and by means of an appropriate longitudinal adjustment are set onto the ground or a rail or the like. The cantilever arm 9 is swivelled in loading direction, where the limit stop 10 provides a rigid support for taking up the load. Now, the loading device can be swivelled to the side by means of the operating cylinders 5, until the load carrying harness 13 mounted at the cantilever arm 9 can be attached to the container L or the like, and by actuating the operating cylinders 5 and the telescopic columns 4 the load can be lifted and moved to the vehicle frame 1. If the load is going to be put onto the ground, the cantilever arm 9 will have to be turned round and the container will have to be lifted from the vehicle frame and put down on the side (represented in phantom lines).

When a container is loaded onto the vehicle frame 1, it can be put down on the supports 15 of the brackets 3, so that the load is transferred from the brackets to the vehicle frame and there is in addition the possibility for a longitudinal movement of the loaded containers by displacing the brackets 3 relative to the vehicle frame 1, which in the case of an unfavorable loading position of the vehicle frame provides for a subsequent positioning of the container on the vehicle frame 1 as it is suitable for transport. As soon as the container has been put down, the harness 13 can be removed and the abutment 12 can be withdrawn (represented in phantom lines in FIG. 1), so that it is possible to lower the loading units below the upper side of the container in order to reduce the transport height.

The loading device in accordance with the invention has a simple and stable construction and at the same time leads to an efficient container loading concept that can be used in a space-saving manner.

We claim:

1. A loading device for containers, which comprises a pair of like loading units to be mounted on a vehicle frame having a longitudinally extending center axis, each loading unit comprising
   (a) a bracket,
   (b) a telescopic column supported on the bracket for pivoting about a common swivel axis defined by the longitudinally extending center axis, the telescopic column consisting of
      (1) a lower leg portion and
      (2) an extendable head portion,
   (C) an operating cylinder acting on the leg portion of the telescopic column at each side thereof,
   (d) a longitudinally adjustable supporting leg pivotally mounted at each side of the bracket,
   (e) a cantilever arm carried by the head portion of the telescopic column and adapted to perform a swivel movement to both sides of the telescopic column about a swivel axis extending parallel to the swivel axis of the telescopic column, the cantilever arm comprising
      (1) an abutment for the connection of a load receiving element, and
   (f) limit stops on the head portion of the telescopic column for the rigid support of respective swivel positions of the cantilever arm on both sides of the telescopic column.

2. The loading device of claim 1, wherein the load receiving element is a load carrying harness.

3. The loading device of claim 1, wherein each supporting leg is supported for swivelling about a swivel axis extending perpendicularly to the swivel axis of the telescopic column and inclined towards the horizontal.

4. The loading device of claim 1, wherein the bracket of each loading unit is independently movable on the vehicle frame in the direction of the longitudinally extending center axis.

5. The loading device of claim 1, wherein each bracket comprises a support for the containers.

6. The loading device of claim 1, wherein the abutment is movably disposed on the cantilever arm for movement in the direction of the swivel axis of the cantilever arm.

* * * * *